(12) United States Patent
Koti et al.

(10) Patent No.: US 11,981,319 B2
(45) Date of Patent: May 14, 2024

(54) METHOD AND SYSTEM FOR IMPROVING FUEL ECONOMY OF A HYBRID POWERTRAIN IN A VEHICLE

(71) Applicant: Cummins Inc., Columbus, IN (US)

(72) Inventors: Archit N. Koti, Columbus, IN (US); Rohinish Gupta, Columbus, IN (US); Xing Jin, Columbus, IN (US); Kenneth M. Follen, Greenwood, IN (US); Arun Prakash Thunga Gopal, Columbus, IN (US); Manik Narula, Columbus, IN (US)

(73) Assignee: CUMMINS INC., Columbus, IN (US)

( * ) Notice: Subject to any disclaimer, the term of this patent is extended or adjusted under 35 U.S.C. 154(b) by 113 days.

(21) Appl. No.: 17/611,082

(22) PCT Filed: May 13, 2020

(86) PCT No.: PCT/US2020/032651
§ 371 (c)(1),
(2) Date: Nov. 12, 2021

(87) PCT Pub. No.: WO2020/232104
PCT Pub. Date: Nov. 19, 2020

(65) Prior Publication Data
US 2022/0242394 A1  Aug. 4, 2022

Related U.S. Application Data

(60) Provisional application No. 62/846,993, filed on May 13, 2019.

(51) Int. Cl.
*B60W 20/16* (2016.01)
*B60L 58/13* (2019.01)
(Continued)

(52) U.S. Cl.
CPC ............ *B60W 20/16* (2016.01); *B60L 58/13* (2019.02); *B60W 30/1882* (2013.01);
(Continued)

(58) Field of Classification Search
CPC .... B60K 2006/4816; B60K 2006/4825; B60K 6/387; B60K 6/48; B60L 2240/12;
(Continued)

(56) References Cited

U.S. PATENT DOCUMENTS 8,167,066 B2  5/2012  Joos et al.
8,392,091 B2  3/2013  Hebbale et al.
(Continued)

FOREIGN PATENT DOCUMENTS

CN  103208853 A  7/2013
CN  103661386 A  3/2014
(Continued)

OTHER PUBLICATIONS

International Search Report and Written Opinion for International patent application No. PCT/US2020/032651, filed May 13, 2020, dated Jul. 27, 2020.
(Continued)

*Primary Examiner* — Tyler J Lee
(74) *Attorney, Agent, or Firm* — Faegre Drinker Biddle & Reath LLC

(57) ABSTRACT

Methods and systems for improving fuel economy and reducing emissions of a vehicle with an electric motor, an engine and an energy storage device are disclosed. The methods and systems involve obtaining lookahead information and current state information, wherein the lookahead information includes a predicted vehicle speed, and the current state information includes a current state of charge (SOC) for the energy storage device coupled to the electric motor; and determining, based on the lookahead information
(Continued)

and the current state information, a target power split between the energy storage device and the engine.

22 Claims, 12 Drawing Sheets

(51) Int. Cl.
*B60W 30/18* (2012.01)
*B60W 30/188* (2012.01)
*B60W 40/10* (2012.01)
*B60W 40/105* (2012.01)
*B60W 50/00* (2006.01)

(52) U.S. Cl.
CPC ...... *B60W 40/105* (2013.01); *B60W 50/0097* (2013.01); *B60L 2240/12* (2013.01); *B60L 2240/525* (2013.01); *B60L 2260/54* (2013.01); *B60L 2270/12* (2013.01); *B60W 2510/244* (2013.01); *B60W 2520/10* (2013.01)

(58) Field of Classification Search
CPC ........... B60L 2240/525; B60L 2260/54; B60L 2270/12; B60L 58/13; B60W 10/06; B60W 10/08; B60W 10/26; B60W 20/11; B60W 20/12; B60W 20/13; B60W 20/16
See application file for complete search history.

(56) References Cited

U.S. PATENT DOCUMENTS

| | | | |
|---|---|---|---|
| 8,909,507 | B2 | 12/2014 | Tsourapas et al. |
| 9,045,134 | B2 | 6/2015 | Zettel et al. |
| 9,328,674 | B2 | 5/2016 | Geveci et al. |
| 11,067,403 | B2 * | 7/2021 | Lindemann ....... B60W 50/0098 |
| 2005/0274553 | A1 | 12/2005 | Salman et al. |
| 2013/0304291 | A1 | 11/2013 | Nawata |
| 2014/0074386 | A1 | 3/2014 | McGee et al. |
| 2015/0203096 | A1 * | 7/2015 | Wang ................. B60W 50/0097 180/65.265 |
| 2015/0224864 | A1 | 8/2015 | Schwartz et al. |
| 2015/0258984 | A1 | 9/2015 | Atluri et al. |
| 2017/0036663 | A1 * | 2/2017 | Kim .................. B60W 50/0097 |
| 2017/0211492 | A1 | 7/2017 | Winiecki |
| 2019/0126907 | A1 | 5/2019 | Park et al. |
| 2019/0248358 | A1 * | 8/2019 | Miller ....................... B60K 6/46 |
| 2019/0375421 | A1 * | 12/2019 | Asher .................. G05B 13/048 |
| 2020/0011687 | A1 * | 1/2020 | Lindemann ........ G01C 21/3469 |

FOREIGN PATENT DOCUMENTS

| | | |
|---|---|---|
| CN | 106677867 A | 5/2017 |
| CN | 108859810 A | 11/2018 |
| EP | 3480076 A1 | 5/2019 |
| JP | 2003269208 A | 9/2003 |
| JP | 2011174393 A | 9/2011 |
| JP | 2012171520 A | 9/2012 |
| WO | 2008073353 A2 | 6/2008 |
| WO | 2010078133 A1 | 7/2010 |
| WO | 2013/110711 A2 | 8/2013 |
| WO | 2017106410 A1 | 6/2017 |

OTHER PUBLICATIONS

Panday et al. "A Review of Optimal Energy Management Strategies for Hybrid Electric Vehicle," International Journal of Vehicular Technology vol. 2014, Article ID 160510, hhtp://dx.doi.org/10.1155/2014/160510, Nov. 18, 2014, [retrieved on Jul. 10, 2020], Retrieved from the Internet: <URL: https://hindawi.com/journas/ijvt/2014/160510/> 19 pages.

International Preliminary Report on Patentability received for PCT Patent Application No. PCT/US2020/032651, dated May 6, 2021, 14 pages.

* cited by examiner

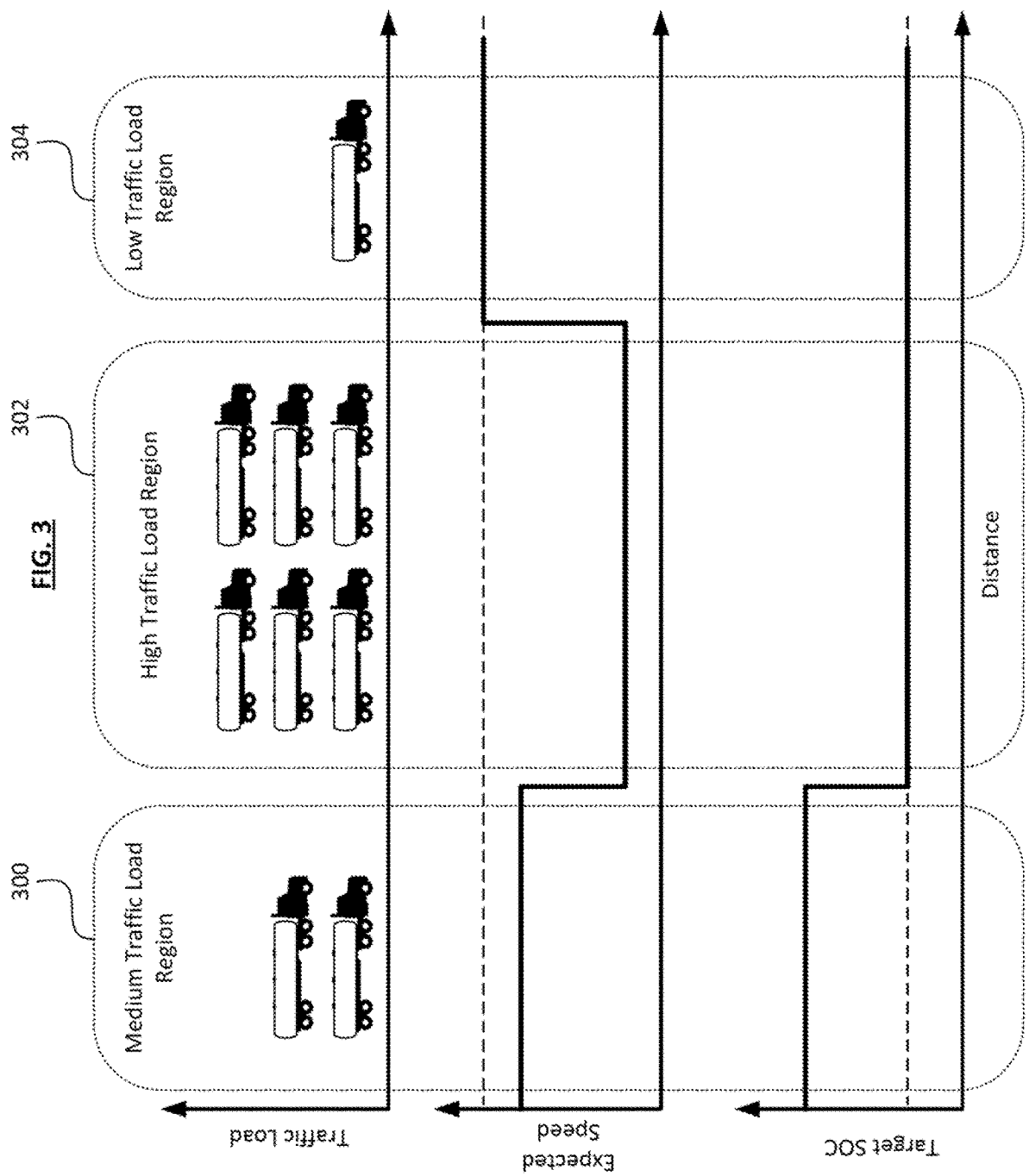

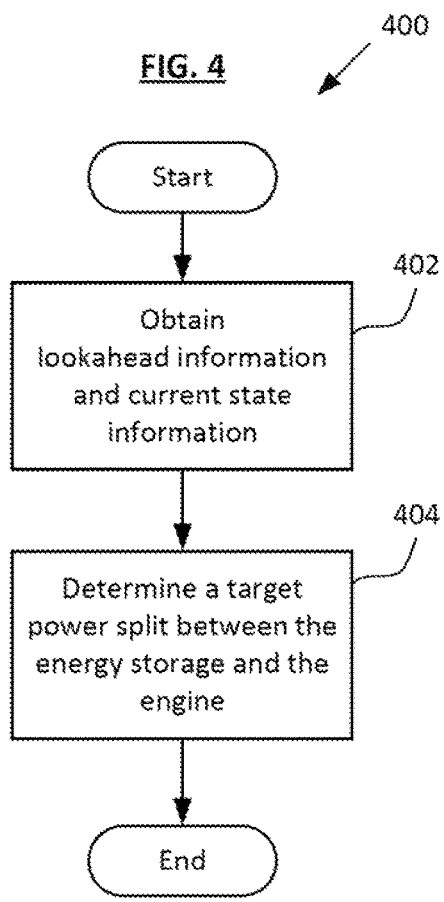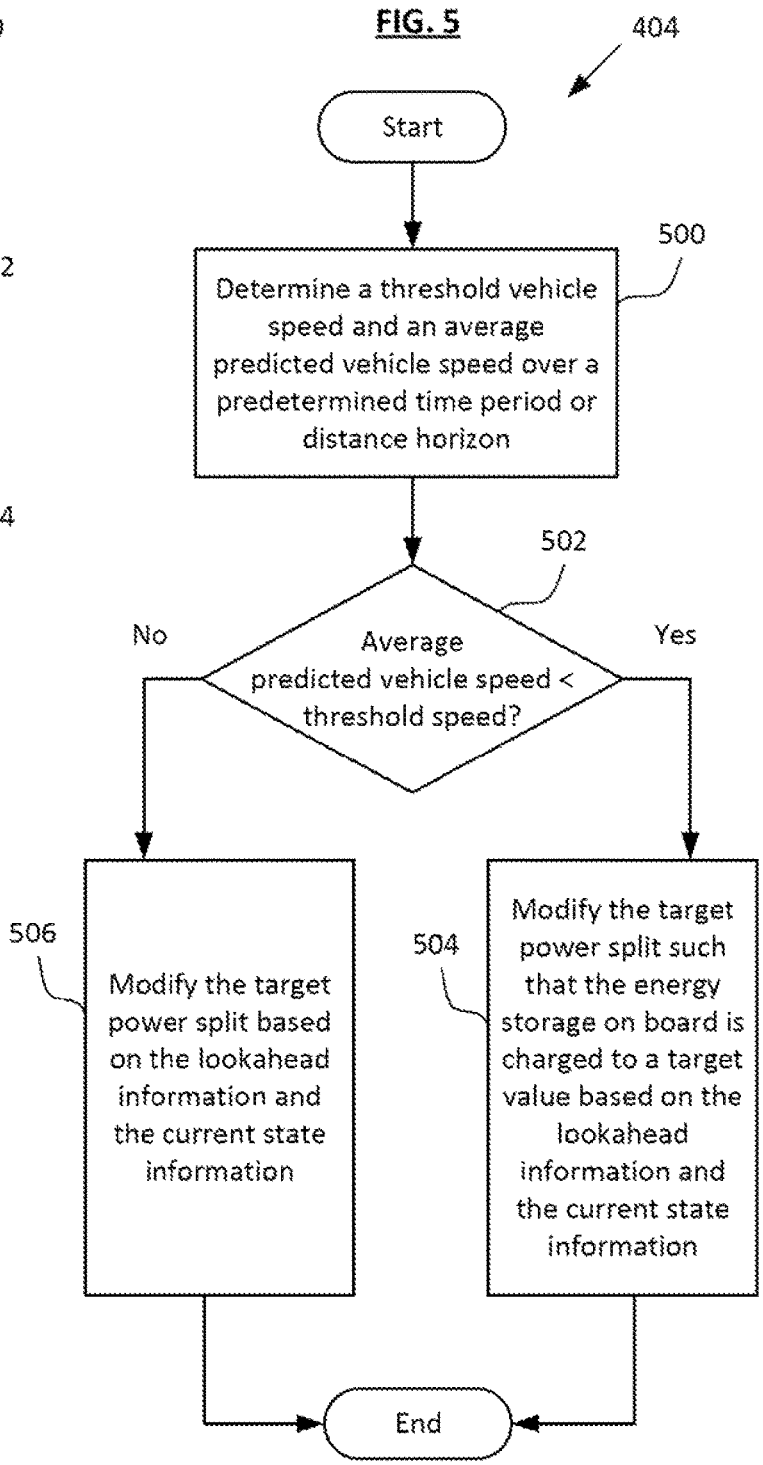

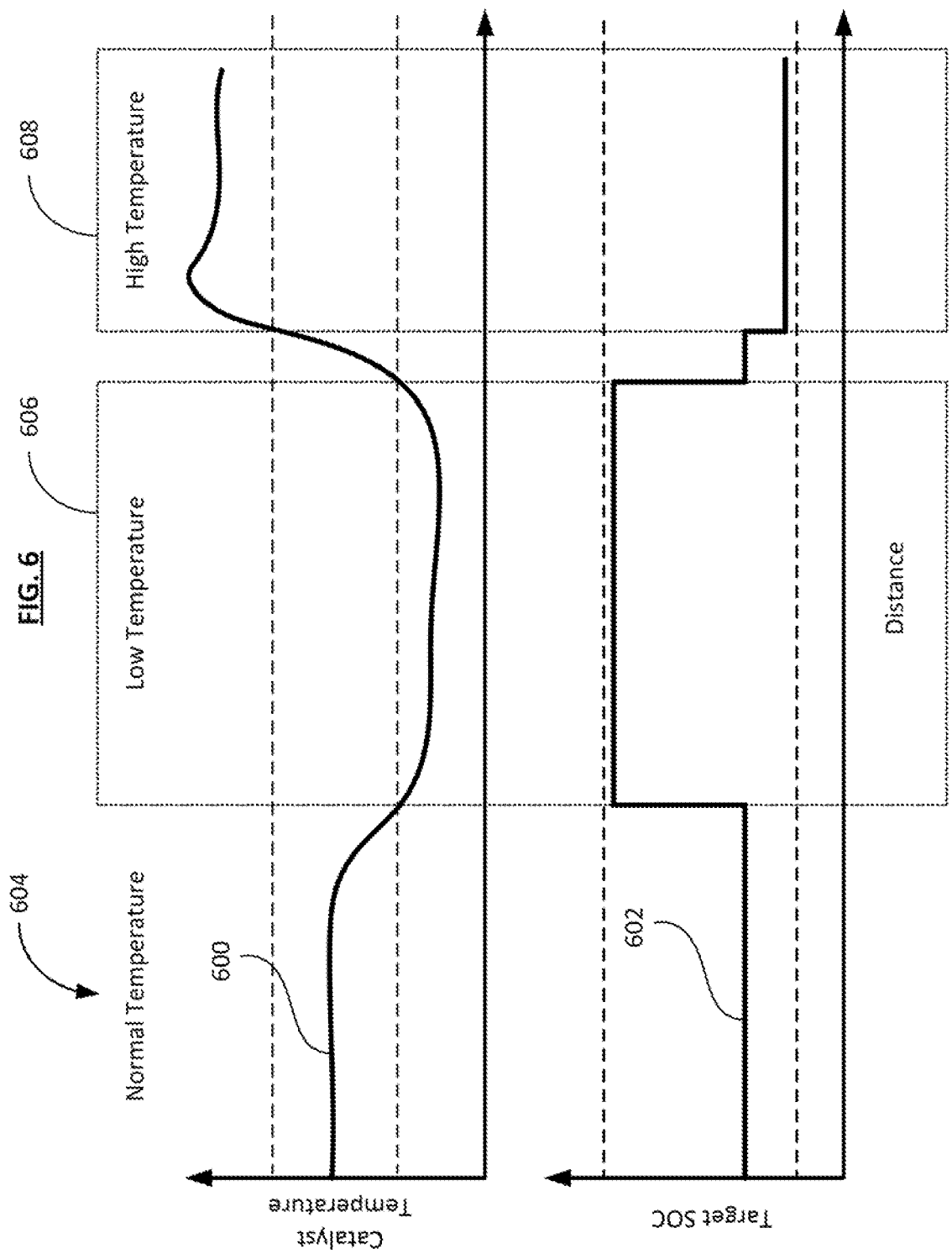

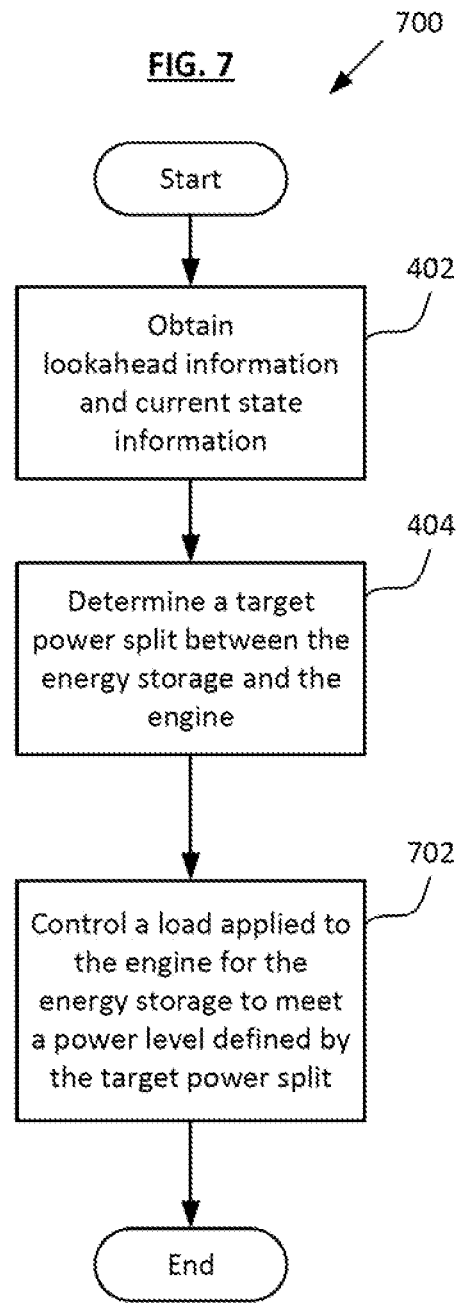

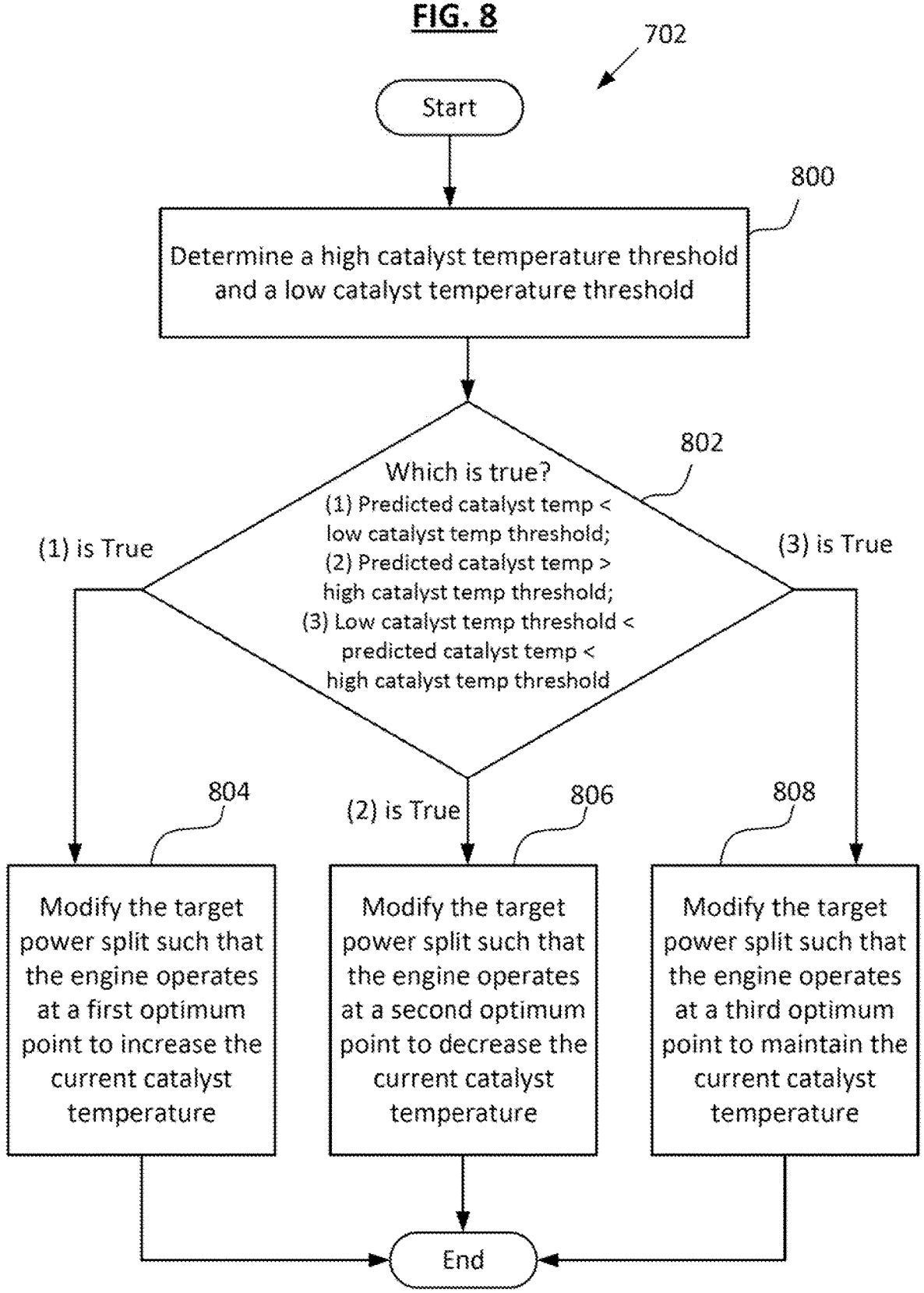

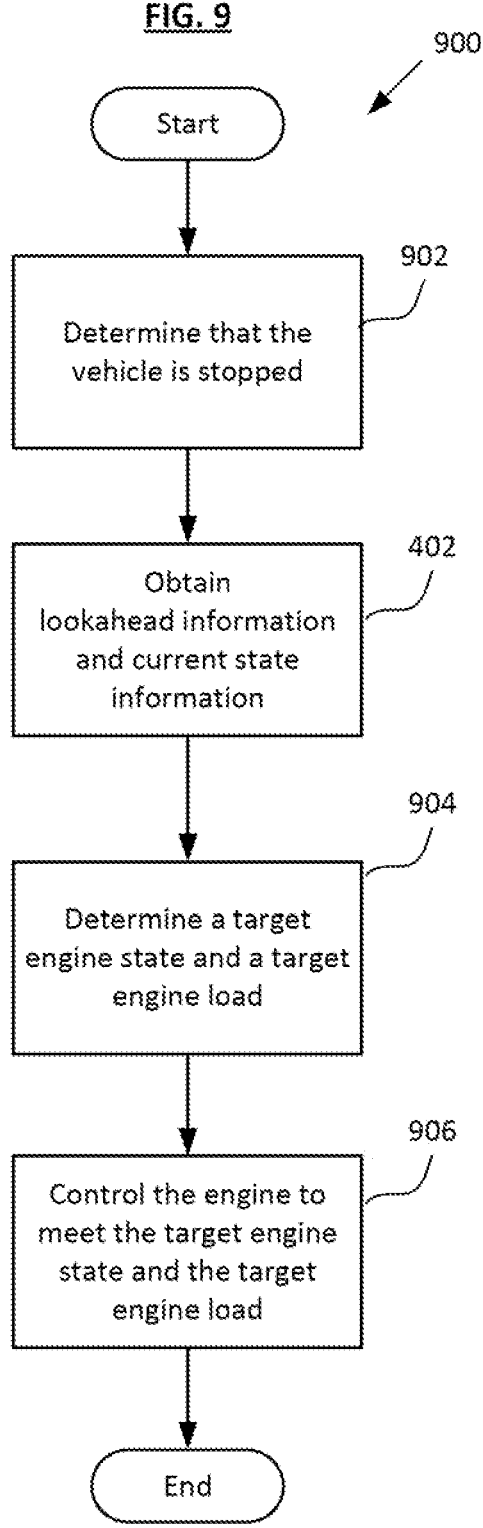

1500

METHOD AND SYSTEM FOR IMPROVING FUEL ECONOMY OF A HYBRID POWERTRAIN IN A VEHICLE

CROSS-REFERENCE TO RELATED APPLICATIONS

This application claims priority to U.S. Provisional Application No. 62/846,993, filed on May 13, 2019, incorporated herein by reference in its entirety.

GOVERNMENT SUPPORT CLAUSE

This application is a national phase application of International Application No. PCT/US2020/032651, filed on May 13, 2020, which claims priority to U.S. Provisional Application No. 62/846,993, filed on May 13, 2019, each incorporated herein by reference in its entirety.

FIELD OF THE DISCLOSURE

The present disclosure relates generally to hybrid vehicles, especially to improving fuel economy of the hybrid vehicles.

BACKGROUND OF THE DISCLOSURE

Recently, there has been an increased demand for vehicles with hybrid powertrains, i.e. hybrid vehicles with multiple forms of motive power, to meet criteria such as improved fuel economy and reduced emissions, all the while maintaining optimal performance for the user. When a hybrid vehicle is moving at a slow speed with a number of stop-starts (i.e., in heavy traffic), with the transmission in a forward gear, but with the driver not pressing the accelerator pedal, the vehicle slowly moves forward in a state known as creep idling. It is preferable to avoid this type of engine idling because much of the fuel that is used during this time is wasted, when it would be more efficient to use the same amount of fuel in a road with light traffic to allow the vehicle to be driven at a much faster speed.

Also, when the temperature of a catalyst used in a selective catalytic reduction (SCR) system is too low or too high, the efficiency of the SCR system drops considerably, causing more nitrogen oxides (NOx) to be released into the atmosphere as vehicle emissions before they can be reduced into diatomic nitrogen and water with the help of a catalyst, such as ammonia. Therefore, it is preferable to avoid using the engine and instead use the electric motor, if possible, to drive the hybrid vehicle when the catalyst temperature is too low and when the catalyst temperature is too high.

Furthermore, turning on the engine while the hybrid vehicle is stopped on the road causes an increase in the NOx emissions from the vehicle. This is because when the engine is initially turned on, the catalyst temperature within the SCR system is not yet high enough to allow for the SCR system to operate efficiently, so the engine needs to keep running for a period of time to raise the catalyst temperature to a preferred temperature. During this process, until the catalyst temperature reaches the preferred temperature, the SCR system continues to operate but not at its optimal efficiency, thereby causing more NOx emissions to be released into the atmosphere.

FIG. 1 illustrates the simulated relationship between time and catalyst temperature for a diesel engine at different power operating points. The graph shows such data for a first operating point 100 at 25 kW power, a second operating point 102 at 50 kW power, a third operating point 104 at 75 kW power, a fourth operating point 106 at 100 kW power, a fifth operating point 108 at 125 kW power, a sixth operating point 110 at 150 kW power, and a seventh operating point 112 at 175 kW power. As shown in FIG. 1, an operating point at a higher power is likely to reach the preferred catalyst temperature faster than another operating point at a lower power.

In view of the above examples, there is a need to operate the hybrid powertrains in hybrid vehicles such that operation of the electric motor and the engine is controlled in a way that is as efficient as possible in terms of fuel economy and reduced emissions.

SUMMARY OF THE DISCLOSURE

Various embodiments of the present disclosure relate to methods and systems to improve fuel economy and reduce emissions of a vehicle with an electric motor, an engine and an energy storage device. In one embodiment, the method involves obtaining lookahead information and current state information, wherein the lookahead information includes a predicted vehicle speed, and the current state information includes a current state of charge (SOC) for the energy storage device coupled to the electric motor. The method also involves determining, based on the lookahead information and the current state information, a target power split between the energy storage device and the engine.

In one aspect of the embodiment, the target power split is determined by: determining a threshold vehicle speed and an average predicted vehicle speed over a predetermined time period or distance horizon; when the average predicted vehicle speed is below the threshold vehicle speed, modifying the target power split such that the energy storage device on board is charged to a target value based on the lookahead information and the current state information; and when the average predicted vehicle speed is above the threshold vehicle speed, modifying the target power split based on the lookahead information and the current state information. In one embodiment, the target power split is dynamically calculated using the lookahead information and the current state information. In one embodiment, the current state information further includes a vehicle power capability comprising at least one of an engine power capability, a motor power capability, and an energy storage device power capability.

Also disclosed herein are methods and systems of improving fuel economy and reducing emissions of a vehicle with an electric motor, an engine, and an energy storage device, which include: obtaining lookahead information and current state information, wherein the lookahead information includes a predicted catalyst temperature, and the current state information includes a current catalyst temperature and a current SOC for the energy storage device coupled to the electric motor; determining, based on the lookahead information and the current state information, a target power split between the energy storage device and the engine; and controlling, based on the predicted catalyst temperature and a difference between the current SOC and the target SOC, a load applied to the engine for the energy storage device to meet a power level defined by the target power split.

In one aspect of the embodiment, target power split is determined by: determining a high catalyst temperature threshold and a low catalyst temperature threshold; when the predicted catalyst temperature is below the low catalyst temperature threshold, modifying the target power split such that the engine operates at a dynamically determined first optimum point to increase the current catalyst temperature; when the predicted catalyst temperature is above the high catalyst temperature threshold, modifying the target power split such that the engine operates at a dynamically determined second optimum point to decrease the current catalyst temperature; and when the predicted catalyst temperature is above the low catalyst temperature threshold and below the high catalyst temperature threshold, modifying the target power split such that the engine operates at a dynamically determined third optimum point to maintain the current catalyst temperature. In one embodiment, the current state information further includes a vehicle power capability comprising at least one of an engine power capability, a motor power capability, and an energy storage device power capability.

Further disclosed herein are methods and systems of improving fuel economy and reducing emissions of a vehicle with an electric motor and an engine and an energy storage device, which include: determining that the vehicle is stopped; obtaining lookahead information and current state information, wherein the lookahead information includes a predicted stop time, a predicted power demand, and a predicted catalyst temperature and the current state information includes a current catalyst temperature, a catalyst response time, and a current engine state; determining, based on the lookahead information and the current state information, a target engine state and a target engine load; and controlling the engine to meet the target engine state and the target engine load. In one aspect of the embodiment, the target engine state is an engine state when the engine is maintained in an off-state until the engine is turned on at a target engine start time. In another aspect of the embodiment, the target engine state and the target engine load are further determined by: when the predicted stop time is longer than the catalyst response time, dynamically calculating the target engine start time based on at least the catalyst response time and the predicted stop time.

Disclosed herein are hybrid powertrain systems of a vehicle, including a control unit, an electric motor coupled to the control unit, an energy storage device coupled to the control unit and the electric motor, an engine coupled to the control unit, and an aftertreatment system. In one embodiment, the control unit obtains lookahead information and current state information, wherein the lookahead information includes a predicted vehicle speed, and the current state information includes a current state of charge (SOC) for the energy storage device and a vehicle power capability; determines, based on the lookahead information and the current state information, a target power split for the powertrain system; and controls, based on the target power split, power allocation to the motor, the energy storage device, and the engine.

Also disclosed herein are hybrid powertrain systems of a vehicle, including a control unit, an electric motor coupled to the control unit, an energy storage device coupled to the control unit and the electric motor, an engine coupled to the control unit, and an aftertreatment system. In one embodiment, the control unit obtains lookahead information and current state information, wherein the lookahead information includes a predicted catalyst temperature, and the current state information includes a current catalyst temperature, a current SOC for the energy storage device coupled to the electric motor, and a vehicle power capability; determines, based on the lookahead information and the current state information, a target power split for the powertrain system; and controls, based on the predicted catalyst temperature and the target power split, a load applied to the engine for the energy storage device to meet a power level defined by the target power split.

Further disclosed herein are hybrid powertrain systems of a vehicle including a control unit, an electric motor coupled to the control unit, an engine coupled to the control unit, an energy storage device, and an aftertreatment system. In one embodiment, when the vehicle is stopped, the control unit obtains lookahead information and current state information, wherein the lookahead information includes a predicted stop time, a predicted power demand for the powertrain, and a predicted catalyst temperature, and the current state information includes a current catalyst temperature, a catalyst response time, and a current engine state; determines, based on the lookahead information and the current state information, a target engine state, a target engine load, and a target time to change the current engine state; and controls the engine to meet the target engine state and the target engine load.

While multiple embodiments are disclosed, still other embodiments of the present disclosure will become apparent to those skilled in the art from the following detailed description, which shows and describes illustrative embodiments of the disclosure. Accordingly, the drawings and detailed description are to be regarded as illustrative in nature and not restrictive.

BRIEF DESCRIPTION OF THE DRAWINGS

The embodiments will be more readily understood in view of the following description when accompanied by the below figures and wherein like reference numerals represent like elements. These depicted embodiments are to be understood as illustrative of the disclosure and not as limiting in any way.

FIG. 3 is a set of graphs showing the relationship between predicted traffic load and target state of charge (SOC) of a hybrid vehicle as disclosed herein;

FIG. 4 is a flow chart illustrating a method of controlling engine load as disclosed herein;

FIG. 5 is a flow chart illustrating a method of controlling engine load according to one embodiment as disclosed herein;

FIG. 6 is a set of graphs showing the relationship between catalyst temperature and target SOC as disclosed herein;

FIG. 7 is a flow chart illustrating a method of controlling engine load according to one embodiment as disclosed herein;

FIG. 8 is a flow chart illustrating a method of determining target power split as disclosed herein;

FIG. 9 is a flow chart illustrating a method of controlling engine load according to one embodiment as disclosed herein;

Figure 1:
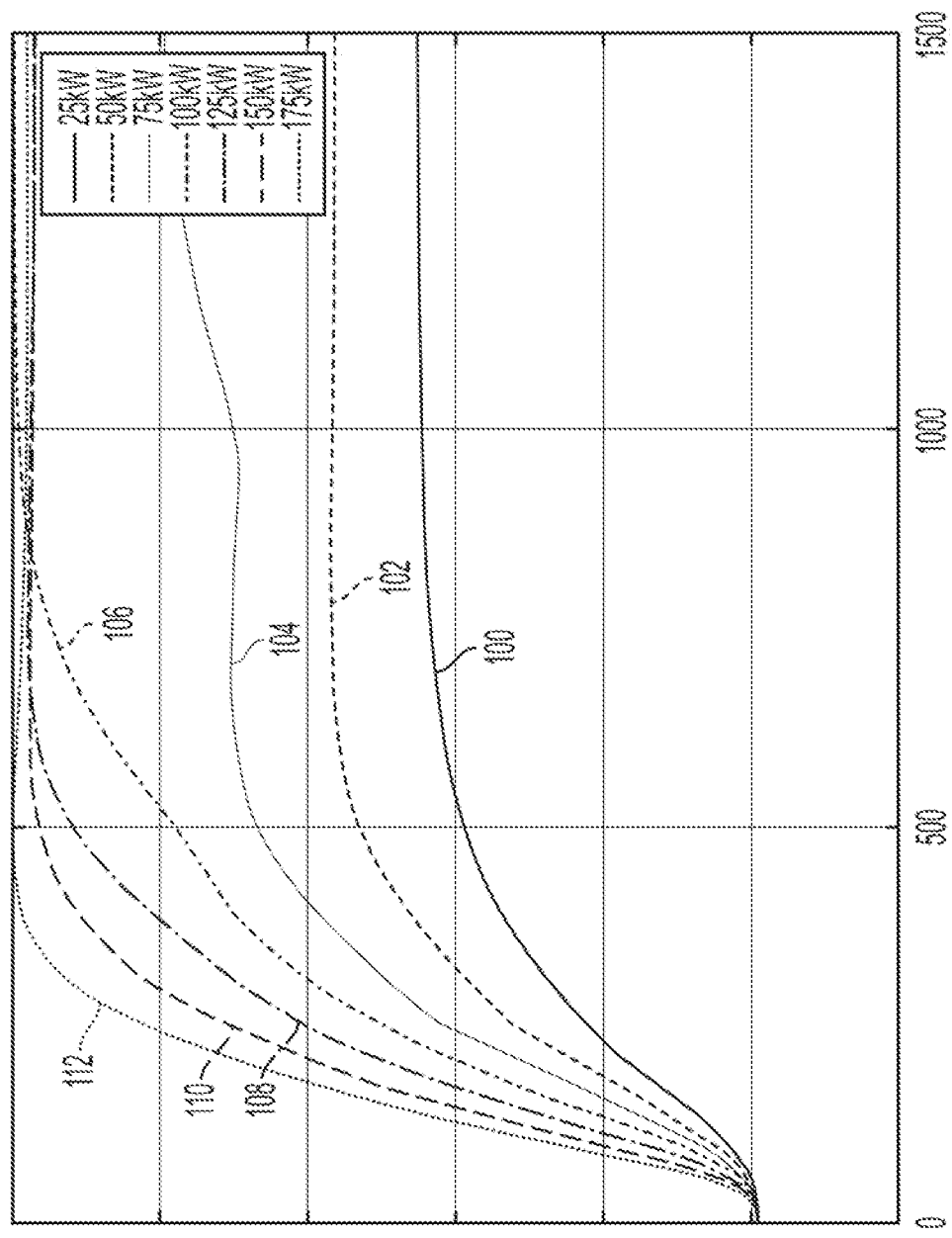
FIG. 1 is a graph showing the relationship between time and SCR catalyst temperature for an engine with different power operating points.

While the present disclosure is amenable to various modifications and alternative forms, specific embodiments have been shown by way of example in the drawings and are described in detail below. The intention, however, is not to limit the present disclosure to the particular embodiments described. On the contrary, the present disclosure is intended to cover all modifications, equivalents, and alternatives falling within the scope of the present disclosure as defined by the appended claims.

DETAILED DESCRIPTION OF THE DISCLOSURE

In the following detailed description, reference is made to the accompanying drawings which form a part hereof, and in which is shown by way of illustration specific embodiments in which the present disclosure is practiced. These embodiments are described in sufficient detail to enable those skilled in the art to practice the present disclosure, and it is to be understood that other embodiments can be utilized and that structural changes can be made without departing from the scope of the present disclosure. Therefore, the following detailed description is not to be taken in a limiting sense, and the scope of the present disclosure is defined by the appended claims and their equivalents.

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments. Furthermore, the described features, structures, or characteristics of the subject matter described herein may be combined in any suitable manner in one or more embodiments.

Figure 2:
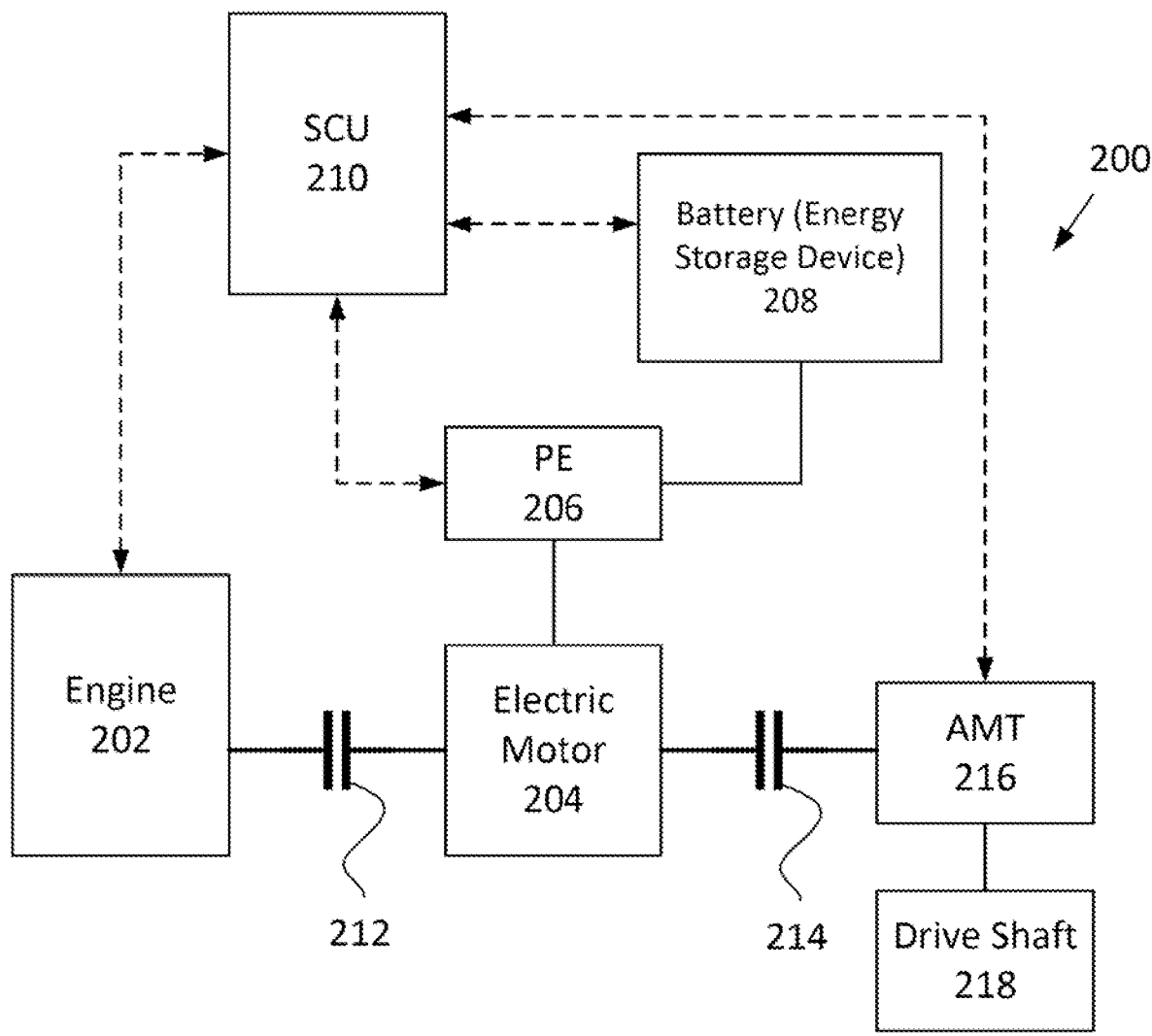
FIG. 2 is a block diagram of an example of a hybrid vehicle with a parallel hybrid architecture in a certain layout.

As shown in FIG. 2, a hybrid vehicle 200 with a parallel hybrid architecture typically has an engine 202 powered by fuel such as gasoline or diesel engine and an electric motor 204 controlled by a power electronics (PE) module 206 and powered by a battery 208. A system control unit (SCU) 210 controls the operation of the engine 202, the PE module 206, and the battery 208. A clutch 212 is located between the engine 202 and the electric motor 204, and another clutch 214 is located between the electric motor 204 and an automated manual transmission (AMT) 216, which is also controlled by the SCU 210. Other configurations of hybrid architecture are also applicable. For example, the components may be positioned such that the AMT 216 couples with both the engine 202 and the motor 204 such that the clutch 212 is located between the engine 202 and the AMT 216, and the clutch 214 is located between the motor 204 and the AMT 216.

FIG. 3 illustrates an example of how the predicted traffic load dynamically affects the target state of charge (SOC) of the battery in a hybrid vehicle, and FIG. 4 shows one example of a predictive control algorithm 400 used in a control system of the vehicle. As explained above, it is preferable to turn off the engine during heavy traffic and instead using it to drive the vehicle during light traffic. In this situation, it is understood that an electric motor is more efficient than the engine when the traffic is heavy. On the contrary, when the hybrid vehicle is moving at a high speed on a road with a light traffic load, it is more beneficial to use the engine to drive the vehicle so that the engine can also charge the battery. Furthermore, frequently turning on the engine to restore battery power under critical thresholds causes penalties on emissions and fuel economy. Based on this understanding, the present method as disclosed herein incorporates lookahead information to predict the traffic load ahead of time to switch between using the engine and the electric motor to drive the vehicle.

In the examples shown herein, the traffic condition is generally divided into three categories: light or low traffic load, medium traffic load, and heavy or high traffic load. Other examples may have the traffic condition sorted into two categories or even four or more categories, as appropriate. In any traffic condition, the vehicle's control system obtains data regarding the traffic load on the road ahead (i.e. lookahead information) as well as the current state information, as shown in step 402 in FIG. 4, and determines a target SOC for the battery in the near future, as shown in step 404. This may be achieved using any predictive control algorithm as incorporated in a vehicle system known in the art, such as by integrating third party digital map data and vehicle sensor data such as camera and GPS data, as well as other cloud-based system algorithms. In one example, the control system controls the engine load so that the battery meets the target SOC, as shown in step 702 in FIG. 7. In some examples, the difference between the current SOC and the target SOC is determined such that the difference, along with the predicted catalyst temperature as shown in FIG. 8, determine the amount of load applied to the engine for the energy storage device to meet a power level defined by the target power split.

For example, when the vehicle is in a medium traffic load region 300 and the control system predicts that a high traffic load region 302 is approaching (i.e. slow expected speed), the control system sets a high target SOC value such that the vehicle can charge the battery while the engine is running. The engine load is subsequently increased to accommodate for the engine charging the battery to reach the high target SOC. When the vehicle reaches the high traffic load region 302 as precited, the engine is turned off and the control system switches to using the electric motor powered by the battery to drive the vehicle. While the vehicle is running on the electric motor, the control system again obtains traffic load data for the road ahead. This time, the control system predicts that the vehicle will reach a low traffic region 304 (i.e. fast expected speed), and the control system sets a low target SOC value so that battery capacity is available to capture regenerative energy to the extent possible when available As long as no high traffic load region is predicted, the control system continues to maintain a low target SOC value for the battery.

FIG. 4 shows a method 400 in which the first step 402 involves obtaining, for example by a processing unit, lookahead information and current state information from a lookahead calculation module that is operatively coupled with the processing unit. Then, in the second step 404, the processing unit determines a target power split between the energy storage (i.e., the electric motor) and the engine, based on the data obtained in step 402. FIG. 5 shows the various steps involved in the step 404. In the first step 500, the processing unit determines a threshold vehicle speed and an average predicted vehicle speed over a predetermined time period or distance horizon, based on the data obtained in step 402. Then, in step 502, the processing unit decides whether the average predicted vehicle speed is less than a threshold speed. If yes, then the processing unit modifies the target power split such that the energy storage on board is charged to a target value based on the lookahead information and the current state information in step 504. Otherwise, the processing unit modifies the target power split based on the lookahead information and the current state information in step 506 without charging the energy storage.

Examples of lookahead information include data provided by an intelligent predictive software application such as an eHorizon (electronic Horizon) module, which provides information based on the current vehicle location relating to possible road patterns, speed restrictions, driving conditions, etc., which may affect the speed at which the vehicle is able to travel at a certain time window (e.g. in the next t seconds in time or d meters in distance) in the future. In one example, the eHorizon module accesses an external server, which is a part of a cloud-based system, to acquire the necessary information for the module to determine the road information to calculate predictions therefrom. In one example, the data received by the eHorizon module include ADAS (Advanced Driver Assistance System) map or other suitable maps as known in the art. There are also other examples of electronics features that utilize lookahead information such as SmartTorque2, SmartCoast and Predictive Cruise Control, all of which are in the ADEPT™ (Advanced Dynamic Efficient Powertrain Technology) suite for Cummins X15™ Efficiency Series engines that are designed and manufactured by Cummins.

FIG. 6 compares changes in a catalyst temperature 600 and how they affect a target SOC value 602 as the vehicle is kept running. In this embodiment, there are three settings available for the target SOC value: high, medium, and low. In a normal catalyst temperature state 604, the target SOC is at a medium level, i.e. between the high and low. When the catalyst temperature dips below the low temperature threshold and enters the low catalyst temperature state 606, the target SOC is set to high. Alternately, when the catalyst temperature rises to above the high temperature threshold and enters the high catalyst temperature state 608, the target SOC is set to low.

FIG. 7 shows a method 700 in which an additional step 702 of controlling a load applied to the engine for the energy storage to meet a power level defined by the target power split is included after step 404 in FIG. 4. The controlling can be performed by a controller operatively coupled to both the energy storage and the engine, for example, such that the power split as determined by the processing unit can be achieved. FIG. 8 shows the various steps involved in the step 702. Firstly, the controller determines a high catalyst temperature threshold and a low catalyst temperature threshold in step 800. These thresholds may be predetermined and stored in the memory of the controller or the associated processing unit, or may be dynamic and adjusted based on the atmospheric temperature, for example, or other environmental factors. Then, the controller determines in step 802 if the predicted catalyst temperature is less than the low catalyst temperature threshold, greater than the high catalyst temperature threshold, or between the low catalyst temperature threshold and the high catalyst temperature threshold. In one situation, the predicted catalyst temperature is below the low catalyst temperature threshold, so the controller proceeds to step 804 where the target power split is modified such that the engine operates at a first optimum point to increase the current catalyst temperature. In another situation, the predicted catalyst temperature is above the high catalyst temperature threshold, so the controller proceeds to step 806 where the target power split is modified such that the engine operates at a second optimum point to decrease the current catalyst temperature. Then, in the last situation, the predicted catalyst temperature is between the two thresholds, so the controller proceeds to step 808 where the target power split is modified such that the engine operates at a third optimum point to maintain the current catalyst temperature. In some examples, the predicted catalyst temperature and the difference between the current SOC and the target SOC are used to determine the amount of load applied to the engine for the energy storage device to meet a power level defined by the target power split.

FIG. 9 shows a method 900 of controlling the engine when the vehicle is stopped. In the first step 902, the processing unit determines that the vehicle is stopped. In one example, the engine is still idling as the vehicle is stopped; in another example, the engine may be turned off entirely. In the next step 402, the lookahead information and current state information are obtained, and then the target engine state and the target engine load are determined in step 904. Lastly, the engine is controlled at step 906, for example by the controller, to meet the target engine state and the target engine load as determined in the previous step.

Figure 10:
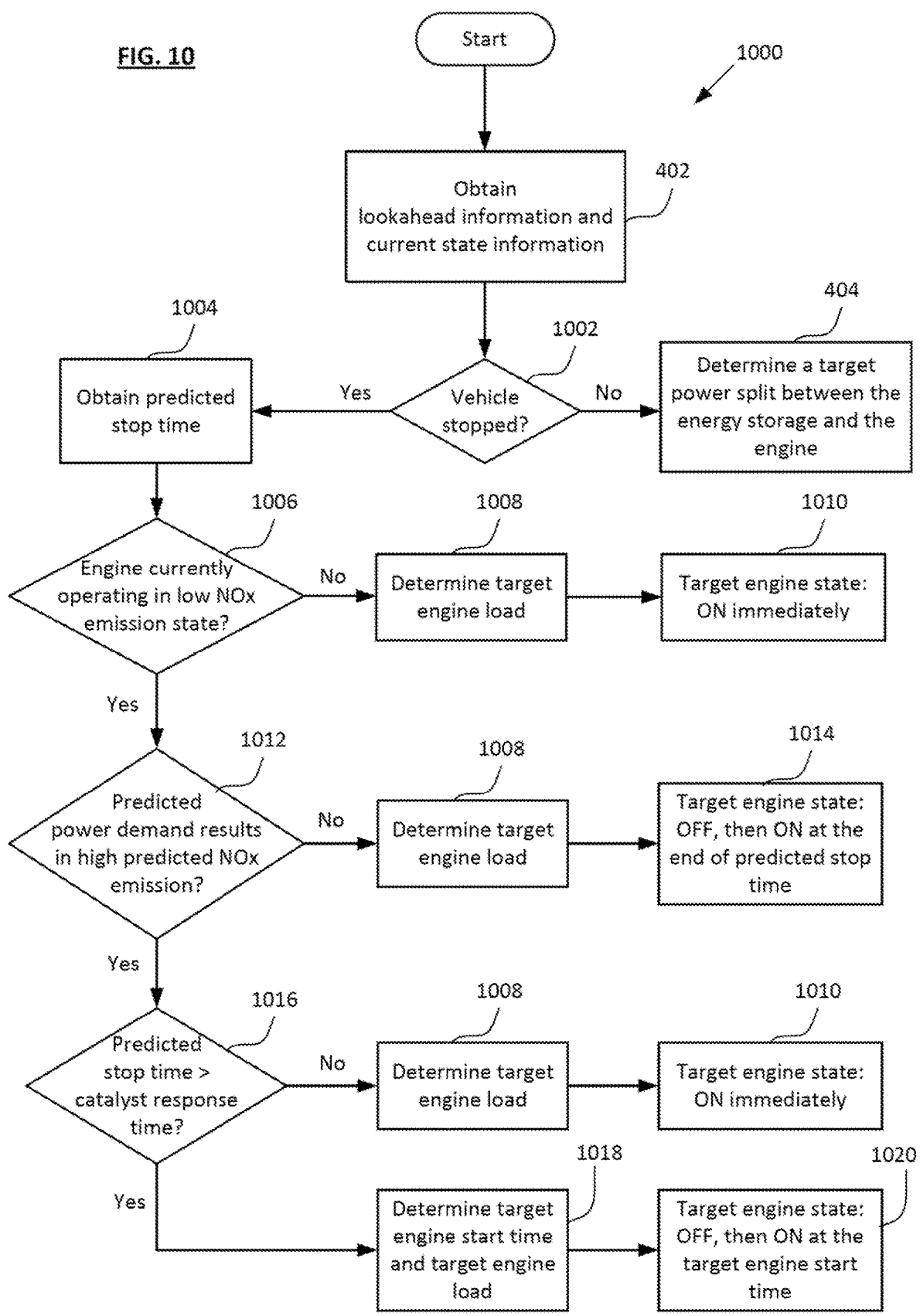
FIG. 10 is a flow chart illustrating a method of determining target engine state as disclosed herein.

FIG. 10 shows a method 1000 of determining a target engine state or target power split between the energy storage and the engine, based on the predicted stop time and other parameters. After the lookahead information and current state information are obtained by the processing unit in step 402, the processing unit then determines if the vehicle is stopped in step 1002. If the vehicle is still running, the method proceeds to step 404 as discussed above. However, if the vehicle is stopped, the processor then obtains a predicted stop time of the vehicle in step 1004. The predicted stop time can be obtained using various methods. For example, the vehicle may have a device connected to a global positioning system (GPS) which works together with a map software to determine the location of the stopped vehicle. The software may determine that the vehicle is temporarily stopped at a level crossing where a train, such as a passenger train or freight train, is blocking the road traveled by the vehicle. Alternatively, the software may determine that the vehicle is caught in a traffic jam caused by one or more of the following: rush hour traffic, accident, construction, or other forms of road blockage. In each situation, the software is capable of predicting the estimated stop time for the vehicle using methods known in the art.

After the predicted stop time is obtained, the processing unit determines if the system is currently operating in a low NOx emission state in step 1006. If the system has NOx emissions higher than a threshold (i.e. the engine is turned on but idling), the processing unit determines the target engine load in step 1008 to lower the NOx emission as soon as possible. As such, the engine is kept on in step 1010 and the target engine load may be increased according to the predicted NOx emission, or other suitable predicted emission conditions.

Alternatively, if the NOx emission is low, the processing unit proceeds to step 1012 to determine whether a predicted power demand results in a high predicted NOx emission. A high NOx emission can be caused by the lack of time for catalyst to be warmed up. As such, at the time when the engine is turned on, the catalyst needs to reach the appropriate temperature to prevent high system NOx emission. The determining step 1012, therefore, depends on the possible load applied to the engine after the engine is turned on. If it is determined that the predicted power demand results in a low predicted NOx emission, the target engine load is determined in step 1008, and the engine remains turned off until the end of the predicted stop time, when the engine is turned on again in step 1014. In this situation, the target engine start time is the same as the predicted stop time, and the target engine load is low.

In some cases, the predicted power demand may be determined to result in a high predicted NOx emission, for example if the catalyst temperature is not adequately warmed up and a heavy load is expected to be applied to the vehicle. If so, the processing unit proceeds to step 1016 and the processing unit determines whether the predicted stop time is longer than a catalyst response time, which is the time required for the catalyst to reach an acceptable temperature from the current catalyst temperature. In the first situation where the predicted stop time is shorter than the catalyst response time, the method proceeds to step 1008 and then to step 1010 as mentioned above. In this situation, the target engine start time is again t=0, and the target engine load also varies according to the predicted NOx emission.

Lastly, the predicted stop time may be longer than the catalyst response time. Then, the target engine start time and target engine load are determined in step 1018, and the engine is kept off and then turned on at the target engine start time, according to step 1020. In this situation, the target engine start time is the predicted stop time minus the catalyst response time, i.e. the engine is started to enable the catalyst to warm up sufficiently by the end of the predicted stop time. The target engine load varies according to the predicted NOx emission.

Figure 11:
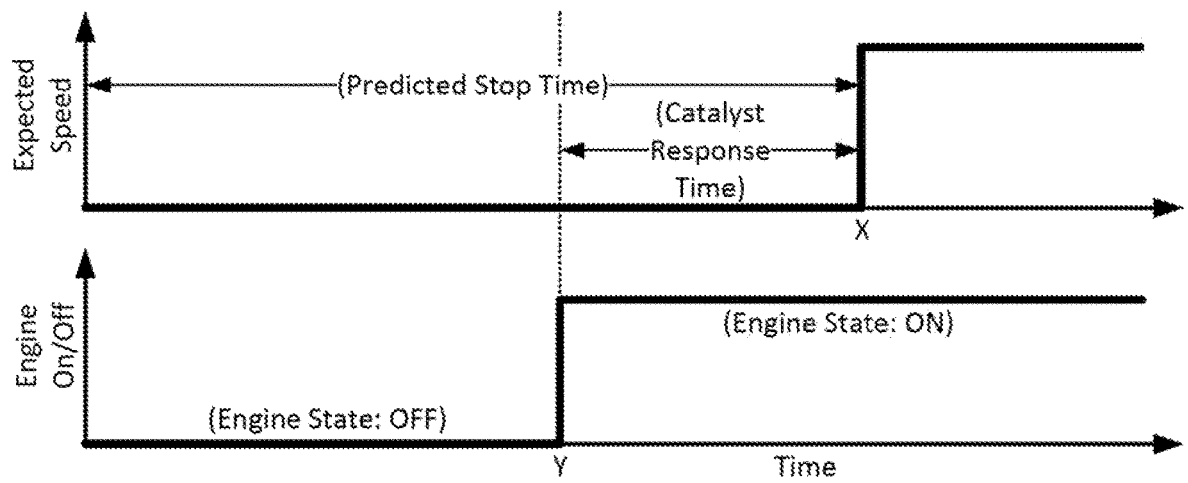
FIG. 11 is a set of graphs showing the relationship between the timing of increasing the expected speed and the activation of an engine in one embodiment as disclosed herein.
Figure 12:
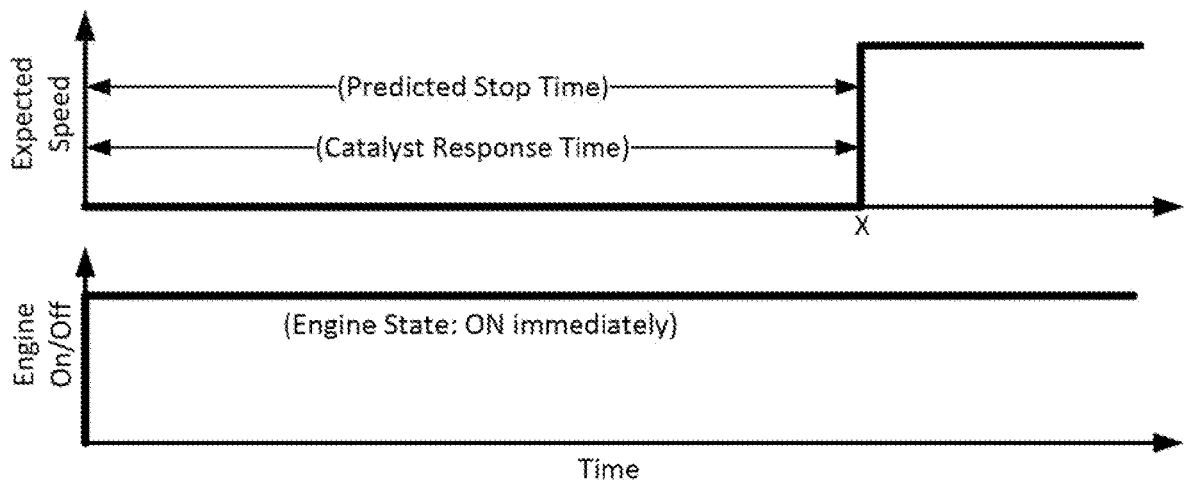
FIG. 12 is a set of graphs showing the relationship between the timing of increasing the expected speed and the activation of an engine in one embodiment as disclosed herein.
Figure 13:
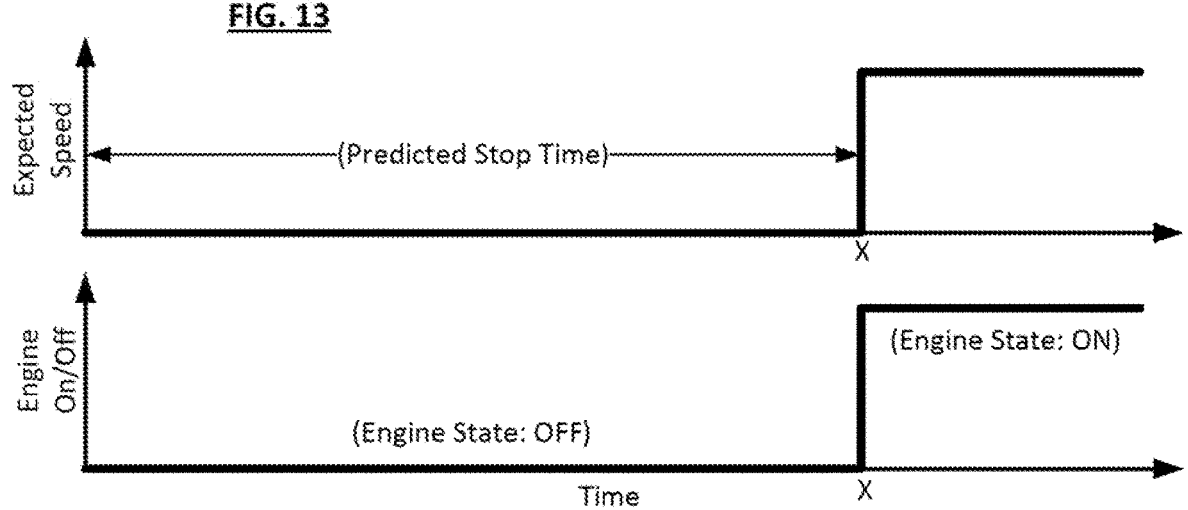
FIG. 13 is a set of graphs showing the relationship between the timing of increasing the expected speed and the activation of an engine in one embodiment as disclosed herein.

FIGS. 11-13 illustrate the different timings in which the engine is turned on based on the predicted stop time, the catalyst response time, and the predicted NOx emission. In FIG. 11, the catalyst response time is shorter than the predicted stop time. Therefore, the engine is turned on at time Y so that by time X, the aftertreatment system is sufficiently warmed up. In this example, the predicted power demand indicates that the system NOx emission will be high after the vehicle starts again, but the catalyst response time is relatively short, so the engine can stay turned off until time Y. On the other hand, in FIG. 12, the predicted power demand indicates that the system NOx emission will be high after the vehicle starts again, but the catalytic response time is either the same as or longer than the predicted stop time. In this example, the engine is turned on immediately at t=0 to warm up the aftertreatment system. The engine load can be adjusted depending on how much NOx emission there will be from the system. In FIG. 13, the predicted power demand indicates that the NOx emission will be low after the vehicle starts again, so there is no need to consider the catalyst response time because the aftertreatment system does not need to be warmed up. The engine is turned on at time X, which is when the predicted stop time ends. As such, the processing unit dynamically estimates the tradeoffs in NOx emission and fuel consumption based on the predicted power demand to determine whether the engine should be started or kept turned off and also the engine's operating point after the engine is turned on.

Figure 14:
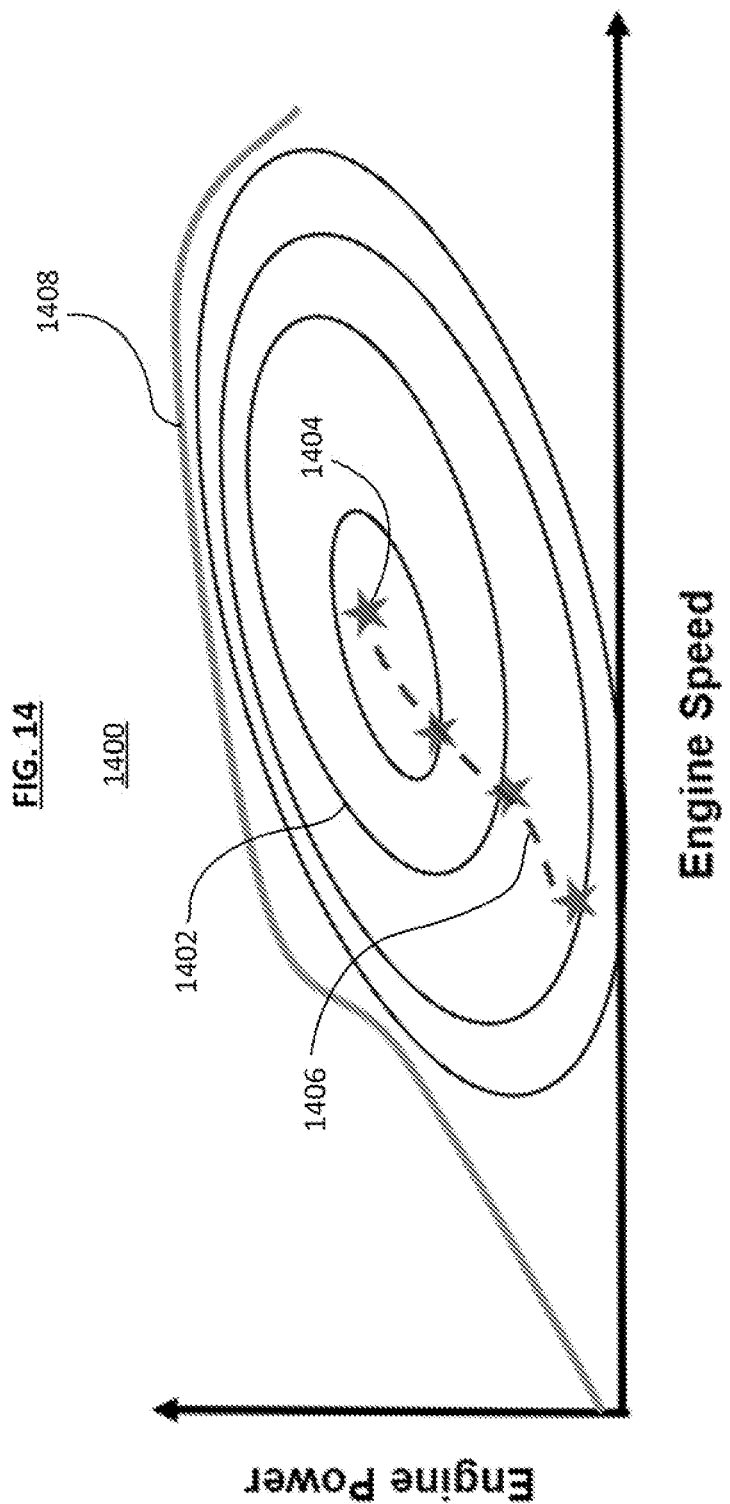
FIG. 14 is a graph showing the relationship between the system NOx emission amount and the combination of engine speed and engine power in one embodiment as disclosed herein.

FIG. 14 illustrates a system NOx map 1400 showing the relationship between the amount of system NOx emission and the combination of the engine speed and the engine power according to the present disclosure. Each ring 1402 shows a region in which the NOx emission is the same for various different combinations of engine speed and engine power. The star 1404 shows the current position of the vehicle in terms of its engine speed and power, and the broken line 1406 shows a path taken by the combination of engine speed and engine power as the relationship moves from a region with a first level of NOx emission to another region with a different, second level of NOx emission, etc. Therefore, each of the three stars to the left of the star 1404 has a different amount of NOx emission. The peak power curve 1408 of the engine shows the maximum amount of power achievable by the vehicle.

Figure 15:
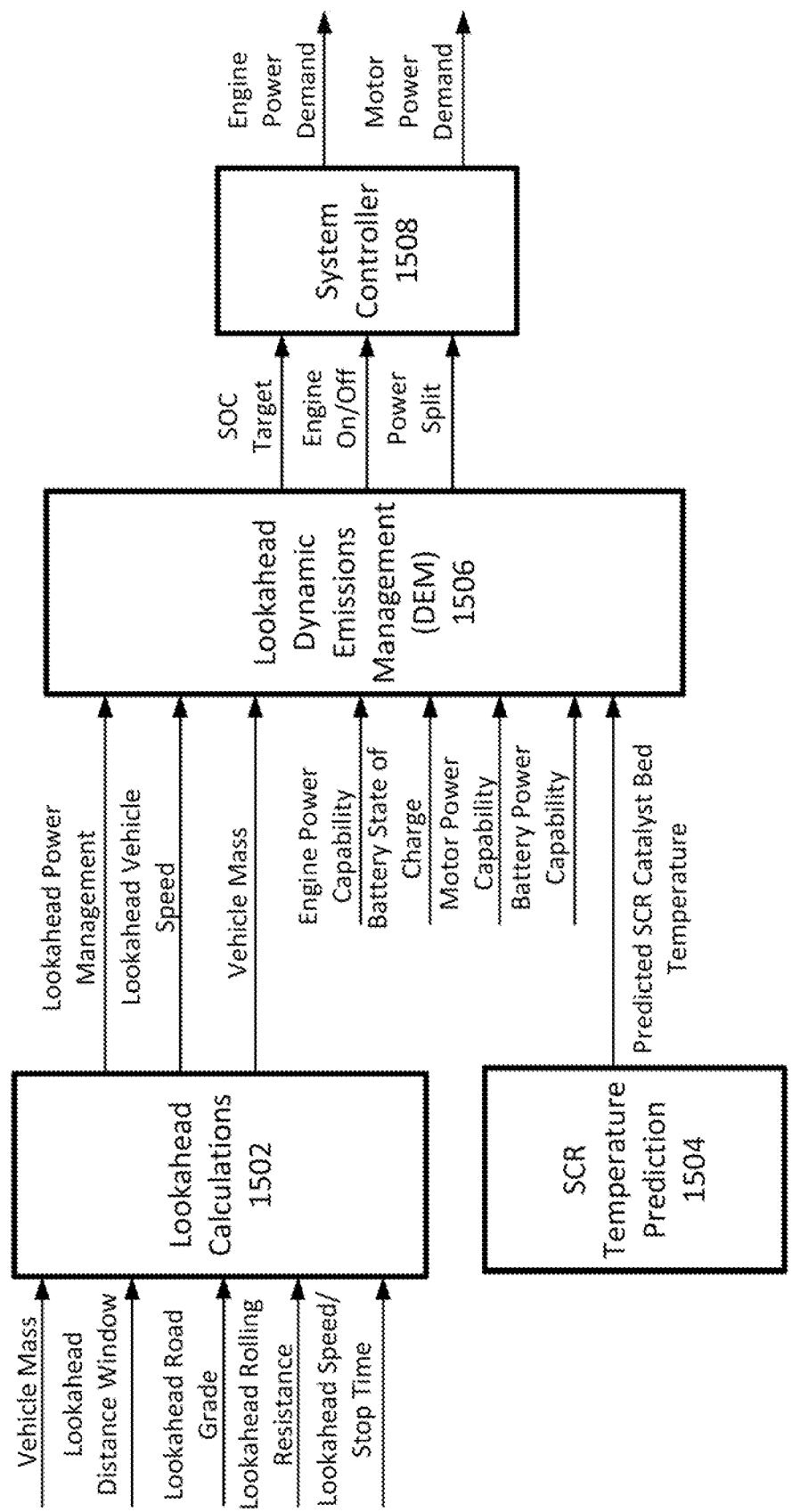
FIG. 15 is a block diagram showing the different inputs and outputs among the different modules and controllers in one embodiment as disclosed herein.

FIG. 15 shows an embodiment of a system 1500 for improving fuel economy and reducing emissions of a vehicle, as disclosed herein. The system 1500 includes four components: a lookahead calculation module 1502, an SCR temperature predicting module 1504, a lookahead dynamic emissions management (DEM) module 1506, and a system controller 1508. The lookahead calculation module 1502 takes in data such as vehicle mass, lookahead distance window, lookahead road grade, lookahead rolling resistance, and lookahead speed/stop time to determine a lookahead power requirement and a lookahead vehicle speed. The SCR temperature prediction module 1504 predicts the SCR catalyst bed temperature. The lookahead DEM module 1506 takes the lookahead power requirement, lookahead vehicle speed, and the vehicle mass from the lookahead calculations module 1502 and the predicted SCR catalyst bed temperature from the SCR temperature prediction module 1504 as inputs, as well as other data such as engine power capability, battery state of charge, motor power capability, and battery power capability, to determine the target SOC and the target power split, as well as whether to turn the engine on or off. The system controller 1508 takes the information outputted by the lookahead DEM module 1506 to determine the engine power demand and the electric motor power demand.

It should be noted that any of the abovementioned data can be either obtained using lookahead algorithms such as applications and software, using sensors associated with the components within the vehicle, such as the battery, engine, motor, and SCR, or pre-programmed and stored in a memory unit accessible by the processing unit. The modules 1502, 1504, and 1506 may be implemented using one or more processing units such as a central processing unit (CPU), a system on a chip (SoC), or a multi-chip module (MCM), etc.

Additionally, the predictive software application can also be integrated with vehicle-to-vehicle (V2V), vehicle-to-infrastructure (V2I), or other vehicle-to-everything (V2X) communication modules for additional benefits. For example, V2X modules enable a vehicle to transmit local dynamic map (LDM) data which includes location information of the vehicle along with other information in a layered configuration. For example, the first layer of a LDM (Type 1 data) contains the permanent static data such as map data, the second layer (Type 2) contains transient static data such as roadside infrastructure, the third layer (Type 3) contains the transient dynamic data such as congestion and signal phase, and the fourth layer (Type 4) contains the highly dynamic data such as location, direction, and speed of other vehicles and/or pedestrians. Using such V2X modules allows for the software application to better predict the future state of the vehicle based on the lookahead information.

The present subject matter may be embodied in other specific forms without departing from the scope of the present disclosure. The described embodiments are to be considered in all respects only as illustrative and not restrictive. Those skilled in the art will recognize that other implementations consistent with the disclosed embodiments are possible. The above detailed description and the examples described therein have been presented for the purposes of illustration and description only and not for limitation. For example, the operations described can be done in any suitable manner. The methods can be performed in any suitable order while still providing the described operation and results. It is therefore contemplated that the present embodiments cover any and all modifications, variations, or equivalents that fall within the scope of the basic underlying principles disclosed above and claimed herein. Furthermore, while the above description describes hardware in the form of a processor executing code, hardware in the form of a state machine, or dedicated logic capable of producing the same effect, other structures are also contemplated.

What is claimed is:

1. A method for improving fuel economy and reducing emissions of a vehicle with an electric motor, an engine and an energy storage device, the method comprising:
    obtaining, by a system control unit, lookahead information and current state information, wherein the lookahead information includes a predicted vehicle speed, and the current state information includes a current state of charge (SOC) for the energy storage device coupled to the electric motor;
    determining, by the system control unit based on the lookahead information and the current state information, a threshold vehicle speed and an average predicted vehicle speed over at least one of a predetermined time period or a predetermined distance horizon;
    determining, by the system control unit based on the threshold vehicle speed and the average predicted vehicle speed, a target power split to split a power allocation between the energy storage device and the engine; and
    controlling, by the system control unit based on the target power split, the power allocation to the electric motor, the energy storage device, and the engine.

2. The method of claim 1, wherein determining the target power split comprises:
    determining, by the system control unit, that the average predicted vehicle speed is below the threshold vehicle speed; and
    modifying, by the system control unit, the target power split such that the energy storage device is charged to a target value based on the lookahead information and the current state information.

3. The method of claim 1, wherein determining the target power split comprises:
    determining, by the system control unit, that the average predicted vehicle speed is above the threshold vehicle speed; and
    modifying, by the system control unit, the target power split based on the lookahead information and the current state information.

4. The method of claim 1, wherein the target power split is dynamically calculated using the lookahead information and the current state information.

5. The method of claim 1, wherein the current state information further includes a vehicle power capability comprising at least one of an engine power capability, a motor power capability, and an energy storage device power capability.

6. The method of claim 1, further comprising:
    obtaining, by the system control unit, the lookahead information and the current state information, wherein the lookahead information further includes a predicted catalyst temperature, and the current state information includes a current catalyst temperature and the current SOC for the energy storage device;
    determining, by the system control unit based on the lookahead information and the current state information, the target power split between the energy storage device and the engine; and
    controlling, by the system control unit based on the predicted catalyst temperature and a difference between the current SOC and the target SOC, a load applied to the engine for the energy storage device to meet a power level defined by the target power split.

7. The method of claim 6, wherein determining the target power split comprises:
    determining, by the system control unit, a high catalyst temperature threshold and a low catalyst temperature threshold.

8. The method of claim 7, wherein determining the target power split comprises:
    determining, by the system control unit, that the predicted catalyst temperature is below the low catalyst temperature threshold; and
    modifying, by the system control unit, the target power split such that the engine operates at a dynamically determined first optimum point to increase the current catalyst temperature.

9. The method of claim 7, wherein determining the target power split comprises:
    determining, by the system control unit, that the predicted catalyst temperature is above the high catalyst temperature threshold; and
    modifying, by the system control unit, the target power split such that the engine operates at a dynamically determined second optimum point to decrease the current catalyst temperature.

10. The method of claim 7, wherein determining the target power split comprises:
    determining, by the system control unit, that the predicted catalyst temperature is above the low catalyst temperature threshold and below the high catalyst temperature threshold; and
    modifying, by the system control unit, the target power split such that the engine operates at a dynamically determined third optimum point to maintain the current catalyst temperature.

11. The method of claim 6, wherein the current state information further includes a vehicle power capability comprising at least one of an engine power capability, a motor power capability, and an energy storage device power capability.

12. The method of claim 1, further comprising:
    determining, by the system control unit, that the vehicle is stopped;
    obtaining, by the system control unit, the lookahead information and the current state information, wherein the lookahead information further includes a predicted stop time, a predicted power demand, and a predicted catalyst temperature and the current state information includes a current catalyst temperature, a catalyst response time, and a current engine state;

determining, by the system control unit based on the lookahead information and the current state information, a target engine state and a target engine load; and controlling, by the system control unit, the engine to meet the target engine state and the target engine load.

13. The method of claim 12, wherein the target engine state is an engine state when the engine is maintained in an off-state until the engine is turned on at a target engine start time.

14. The method of claim 13, wherein determining the target engine state and the target engine load further comprises:

determining, by the system control unit, that the predicted stop time is longer than the catalyst response time; and dynamically calculating, by the system control unit, the target engine start time based on at least the catalyst response time and the predicted stop time.

15. A vehicle system comprising:
an engine;
an electric motor;
an energy storage device coupled with the electric motor; and
a controller configured to:
obtain lookahead information and current state information, wherein the lookahead information includes a predicted vehicle speed, and the current state information includes a current state of charge (SOC) for the energy storage device coupled to the electric motor; and
determine, based on the lookahead information and the current state information, a target power split to split a power allocation between the energy storage device and the engine by determining a threshold vehicle speed and an average predicted vehicle speed over at least one of a predetermined time period or a predetermined distance horizon.

16. The vehicle system of claim 15, wherein the controller determines the target power split by:
determining that the average predicted vehicle speed is below the threshold vehicle speed; and
modifying the target power split such that the energy storage device is charged to a target value based on the lookahead information and the current state information.

17. The vehicle system of claim 15, wherein the controller determines the target power split by:
determining that the average predicted vehicle speed is above the threshold vehicle speed; and
modifying the target power split based on the lookahead information and the current state information.

18. The vehicle system of claim 15, wherein the controller dynamically calculates the target power split based on the lookahead information and the current state information.

19. The vehicle system of claim 15, wherein the current state information further includes a vehicle power capability comprising at least one of an engine power capability, a motor power capability, and an energy storage device power capability.

20. A method for improving fuel economy and reducing emissions of a vehicle with an electric motor, an engine and an energy storage device, the method comprising:

obtaining, by a system control unit, lookahead information and current state information, wherein the lookahead information includes a predicted vehicle speed, and the current state information includes a current state of charge (SOC) for the energy storage device coupled to the electric motor; and determining, by the system control unit based on the lookahead information and the current state information, a target power split between the energy storage device and the engine by determining a threshold vehicle speed and an average predicted vehicle speed over at least one of a predetermined time period or a predetermined distance horizon, wherein (1) in response to determining that the average predicted vehicle speed is below the threshold vehicle speed, the target power split is modified such that the energy storage device is charged to a target value based on the lookahead information and the current state information, or (2) in response to determining that the average predicted vehicle speed is above the threshold vehicle speed, the target power split is modified based on the lookahead information and the current state information.

21. A method for improving fuel economy and reducing emissions of a vehicle with an electric motor, an engine and an energy storage device, the method comprising:

obtaining, by a system control unit, lookahead information and current state information, wherein the lookahead information includes a predicted vehicle speed and a predicted catalyst temperature, and the current state information includes a current state of charge (SOC) for the energy storage device coupled to the electric motor and a current catalyst temperature; and determining, by the system control unit based on the lookahead information and the current state information, a target power split between the energy storage device and the engine; and controlling, by the system control unit based on the predicted catalyst temperature and a difference between the current SOC and the target SOC, a load applied to the engine for the energy storage device to meet a power level defined by the target power split.

22. A method for improving fuel economy and reducing emissions of a vehicle with an electric motor, an engine and an energy storage device, the method comprising:

determining, by the system control unit, that the vehicle is stopped;

obtaining, by a system control unit, lookahead information and current state information, wherein the lookahead information includes a predicted vehicle speed, a predicted stop time, a predicted power demand, and a predicted catalyst temperature, and the current state information includes a current state of charge (SOC) for the energy storage device coupled to the electric motor, a current catalyst temperature, a catalyst response time, and a current engine state;

determining, by the system control unit based on the lookahead information and the current state information, a target engine state and a target engine load; and controlling, by the system control unit, the engine to meet the target engine state and the target engine load.

* * * * *